(12) United States Patent
Nozka et al.

(10) Patent No.: US 12,498,017 B1
(45) Date of Patent: Dec. 16, 2025

(54) GEAR SYSTEM WITH COMPLIANT ANTI-BACKLASH FEATURES

(71) Applicant: HONEYWELL INTERNATIONAL INC., Charlotte, NC (US)

(72) Inventors: Michal Nozka, Brno (CZ); Tomas Ripel, Brno (CZ); Antonin Skarolek, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/039,495

(22) Filed: Jan. 28, 2025

(51) Int. Cl.
  *F16H 1/28* (2006.01)
  *F16H 1/26* (2006.01)
  *F16H 1/48* (2006.01)
  *F16H 55/18* (2006.01)
  *F16H 57/12* (2006.01)

(52) U.S. Cl.
  CPC .............. *F16H 1/2863* (2013.01); *F16H 1/26* (2013.01); *F16H 1/2845* (2013.01); *F16H 1/48* (2013.01); *F16H 55/18* (2013.01); *F16H 57/12* (2013.01); *F16H 2057/125* (2013.01)

(58) Field of Classification Search
  CPC ........ F16H 1/2863; F16H 1/26; F16H 1/2845; F16H 1/48; F16H 55/18; F16H 57/12; F16H 2057/125
  See application file for complete search history.

(56) References Cited

U.S. PATENT DOCUMENTS

| | | | |
|---|---|---|---|
| 3,361,002 A * | 1/1968 | Staehlin | F16H 55/18 74/440 |
| 5,085,093 A * | 2/1992 | Heidrich | F16H 1/26 74/411 |
| 5,240,462 A | 8/1993 | Mochizuki et al. | |
| 7,383,750 B2 | 6/2008 | Menjak et al. | |
| 9,746,066 B2 * | 8/2017 | Venter | F16H 55/14 |
| 10,539,205 B2 | 1/2020 | Koch et al. | |
| 2002/0121152 A1* | 9/2002 | White | F16H 55/18 74/409 |
| 2010/0240490 A1* | 9/2010 | Schafer | F16H 55/18 475/347 |
| 2013/0150205 A1 | 6/2013 | Wu et al. | |
| 2013/0199323 A1 | 8/2013 | Fong et al. | |

FOREIGN PATENT DOCUMENTS

| | | | |
|---|---|---|---|
| EP | 3152467 A2 | 8/2024 | |
| JP | H02129434 A * | 5/1990 | |

\* cited by examiner

*Primary Examiner* — Justin Holmes
(74) *Attorney, Agent, or Firm* — Ingrassia Fisher & Lorenz LLP

(57) ABSTRACT

Gear systems provide backlash control at low loading and effective load carrying at increased loading. A gear system with backlash control includes at least two meshing gears. One of the gears has a gear section configured for carrying loads and another gear section configured to control backlash. The gear sections are connected together by a compliant section that has features that reduce stiffness so that the gear sections are moveable relative to each other. One gear section is biased relative to the other gear section so that its teeth are preloaded against the teeth of the first gear.

20 Claims, 5 Drawing Sheets

GEAR SYSTEM WITH COMPLIANT ANTI-BACKLASH FEATURES

TECHNICAL FIELD

The present disclosure generally relates to gear systems in torque transferring machinery and, more specifically, to gear systems with compliant features that operate to reduce backlash and load carrying features to which torque transfer is shifted at increased loads.

BACKGROUND

Torque transfer in machinery such as vehicles, tools, equipment, and other apparatus may be employed to convey power within or to various devices. For example, an engine may be employed to power a mobile platform, such as aircraft, land vehicles, sea vehicles or to power stationary platforms and other machines. Generally, within machinery, various components are connected together to form assemblies that convey power from an input device to a responsive device. For example, an engine or a motor may be employed as the input device to deliver power to various actuators or other loads as the responsive devices. The delivery of power may be through a gear system.

In gear systems, backlash, or clearance/play between meshing gears may arise due to design tolerances, manufacturing variation or wear over time. Backlash may occur in any type of gear system, including those with planetary gearsets. In various applications, such as to provide actuation outputs and/or sensing inputs, minimalizing backlash is desirable to provide accurate positional control and/or parameter sensing. Solutions that minimize backlash may result in lowered efficiency and undesirable friction and wear in gear systems.

Accordingly, it is desirable to provide gear systems for machinery that provide more effective backlash reduction without efficiency losses or excessive component wear. In addition, it is preferable if such systems do not increase manufacturing complexity or mass. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

The gear systems disclosed herein provide backlash control at low loading and efficient torque transfer at increased loading. In a number of embodiments, a gear system with backlash control includes at least two meshing gears. One of the gears has a gear section configured for carrying loads and another gear section configured to control backlash. The gear sections are connected together by a compliant section that has features that reduce stiffness so that the gear sections are moveable relative to each other. One gear section is biased relative to the other gear section so that its teeth are preloaded against the teeth of the first gear.

In a number of additional embodiments, a gear system with backlash control includes at least two gears where one of the gears has a gear section with gear teeth configured for carrying loads and has another gear section with teeth configured to control backlash. The gear sections are connected together by a compliant section having a generally cylindrical shape with features around the compliant section that reduce stiffness so that the gear teeth of the gear sections are moveable relative to one another. One of the gear sections is biased relative to the other gear section so that its gear teeth are preloaded against the other gear and so that its gear teeth are disposed different than the other gear teeth of the other gear section when the gear system is unloaded or lightly loaded.

In a number of additional embodiments, a gear system with backlash control includes a first gear having first gear teeth, and a second gear meshing with the first gear. The second gear has a first gear section with second gear teeth configured for carrying loads and has a second gear section with third gear teeth configured to control backlash. The first gear section is connected with the second gear section by a compliant section that has a generally cylindrical shape with openings around the compliant section that reduce stiffness so that the third gear teeth of the second gear section are moveable relative to the second gear teeth of the first gear section. The second gear section is biased relative to the first gear section so that the third gear teeth of the second gear section are preloaded against the first gear teeth of the first gear and the third gear teeth are disposed different than the second gear teeth relative to the first gear teeth when the gear system is unloaded. The first gear section is more rigid than the second gear section so that the first gear section carries the loads at increased loading of the gear system.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
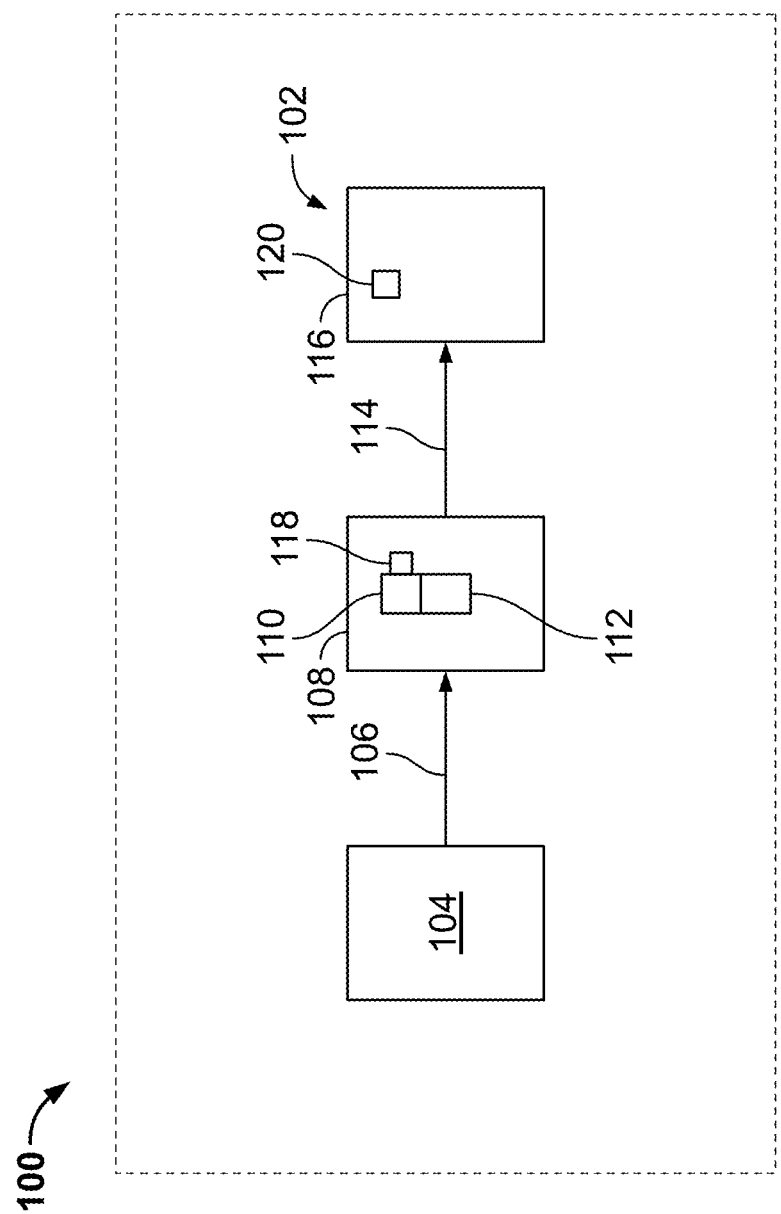
FIG. 1 is a schematic illustration of a machine with a gear system, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

As described herein through example gear systems which may include planetary gearsets and/or other types of meshing gears, at least a pair of meshing gears has one gear that has two portions-one toothed section for load carrying and another toothed section for backlash control/reduction. The backlash reducing section is a type of gear that is disposed differently compared to the load carrying section. In one example, the difference is oversizing that may be accomplished, for example, by tuning the tooth size/thickness or the profile shift coefficient, or by leaving the toothed section pre-finished, but not finished to the same extent as the load carrying section. The gear may include a compliant section that has some type of openings such as cavities, grooves or cuts separating parts of the gear corresponding to one or more of the teeth allowing movement and providing compliance so that the backlashing reducing section is flexible. Assembling the gear in its application creates slight deformation and preloads the backlash reducing section against its meshing gear(s). Under initial loading, the backlash reducing section mitigates play between the meshing gears and as loading increases, the load carrying section takes over the torque transfer function.

Referring to FIG. 1, a machine 100 includes a gear system 102. In the current embodiment, the machine 100 may be a vehicle such as an aircraft, land vehicle or water vehicle such as a ship. In other embodiments, the machine 100 may be any physical system that conveys power through gearing to perform actions. For example, actuators on land vehicles, ships, aircraft, machinery, infrastructure and other equipment of many types may perform a number of functions where controllable physical movement is desired. For example, on aircraft, actuators may be used to adjust flight control surfaces like the elevators, rudders, ailerons, flaps, slats and spoilers, extending and retracting landing gear, positioning engine inlet guide vanes and thrust reversers, and opening and closing cargo or weapon bay doors. In other applications, power transmission may be used for many types of effects other than actuation. In addition, sensing of parameters may be employed during and/or following system changes effected by the power transmission. In each case, responsiveness and accuracy may be desirable and therefore, minimizing variation, including by reducing backlash is desirable.

In FIG. 1, the machine 100 and the gear system 102 thereof include a power source in the form of a prime mover 104 which may be an engine, a motor, another machine, a force/torque transfer element, or any combination thereof to deliver an input power 106 to a gearset 108. For purposes of the current disclosure, the term prime mover 104 means anything that delivers power in the form of force and/or torque as the source of motive power of the gear system 102. Force/torque transfer elements may include any power transmitting elements such as shafts, frames, carriers, brakes, clutches, cases, and other structures. The input power 106 may be in the form of a torque and/or a force. The gearset 108 includes at least two meshing gears 110 and 112 and any number of other gears, structures and/or force/torque transfer elements. The gearset 108 may be in the form of a gearbox or otherwise supported gearing. The gearset 108 transmits the input power 106 and operates to multiply torque and/or to change the speed and deliver an output power 114. The output power 114 is delivered to a mechanical operator 116 that carries out a desired function or functions. For example, the mechanical operator 116 may be an actuator that transmits force, torque and/or displacement as a mover. In other examples, the mechanical operator 116 may be a type of linkage that transmits the output power 114 to another apparatus. Rather than being a part of the machine 100, in some embodiments, the prime mover 104 and/or the mechanical operator 116 may be a part of another machine or system that is coupled with the machine 100. Accordingly, power from the prime mover 104 is conveyed through the gearset 108 to the mechanical operator 116 to effect a desired function. In some embodiments, sensors 118, 120 may be employed to monitor and provide feedback on the movements and functions.

Figure 2:
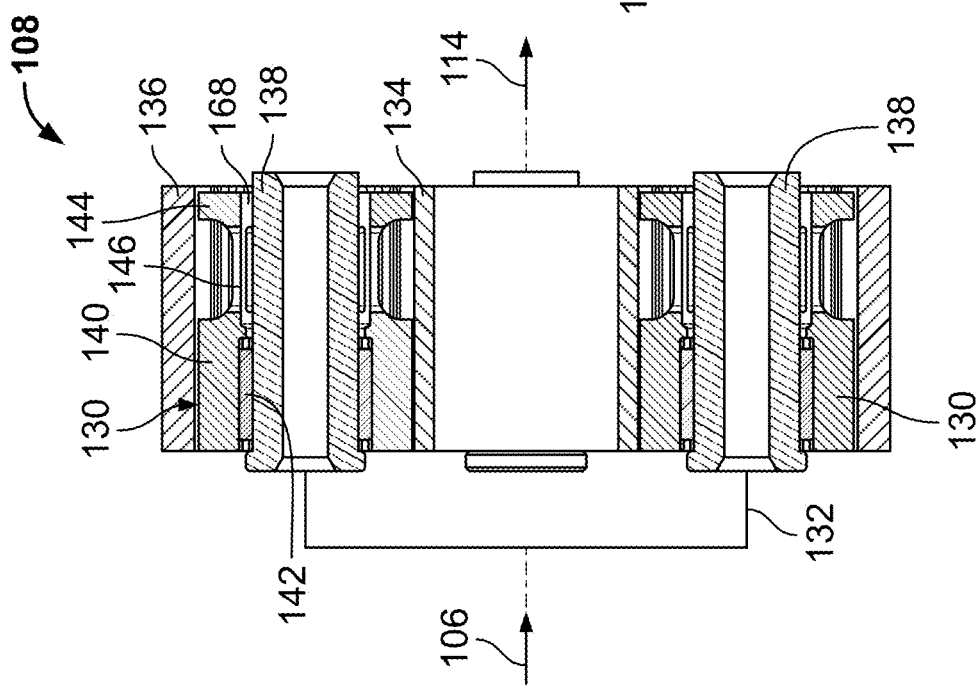
FIG. 2 is a schematic, sectional view of a part of the gear system of the machine of FIG. 1, in accordance with an exemplary embodiment.

Referring to FIG. 2, the gear system 102 may include a planetary type gearset 108, which includes the at least two gears 110 and 112. The gearset 108 includes a set of planet gears 130, of which there may be four, and which are collectively the one gear 112 of the at least two gears of the gearset 108 of FIG. 1. More generally, this one gear 112 may be a type of pinion gear. The planet gears 130 may be carried by a carrier 132 in their orbital path. The gearset 108 also includes a sun gear 134 and a ring gear 136. The sun gear 134 and/or the ring gear 136 may be the other gear 112 of the at least two gears of the gearset 108 of FIG. 1. More generally, this other gear 112 may be any type of gear that meshes with the one gear 110, including a rack type gear. The input and the output from the gearset 108 may be at any of the planet gears 130, the sun gear 134 and/or the ring gear 136. For purposes of this example, the input power 106 is to the carrier 132 and the planet gears 130, the ring gear 134 is fixed, and the output power 114 is from the sun gear 134. The individual planet gears 130 may be rotatably mounted on pins 138 of the carrier 132, which are a type of axle or shaft on which the planet gears 130 rotate.

Figure 3:
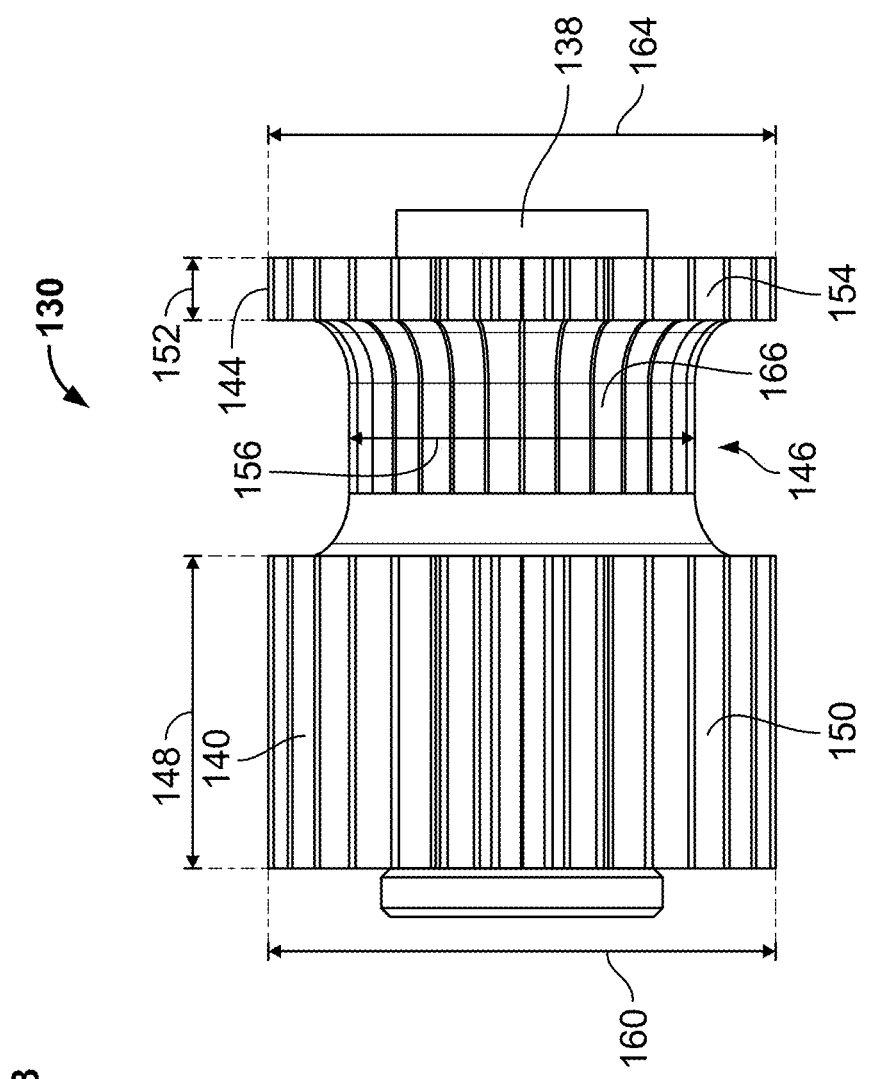
FIG. 3 is a side view of a gear of the gear systems of FIGS. 1 and 2, in accordance with an exemplary embodiment.
Figure 4:
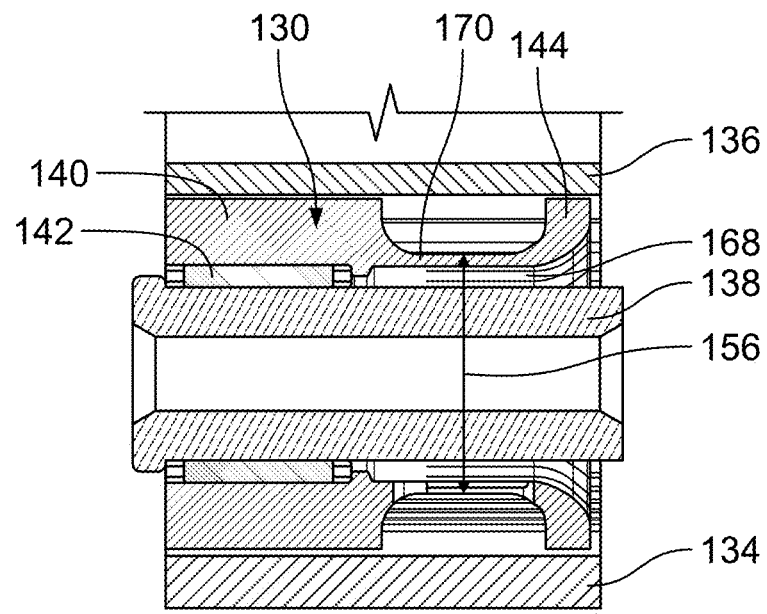
FIG. 4 is a schematic, fragmentary, sectional view of a gear area of the gear systems of FIGS. 1 and 2, in accordance with an exemplary embodiment.

Referring additionally to FIGS. 3 and 4, each planet gear 130 may include a gear section 140 that may also be referred to as the load carrying gear section 140. A bearing assembly 142, which may be a needle-type bearing assembly 142 is disposed between the gear section 140 and the pin 138. As such, loads are transferred between the planet gear carrier 132 through the gear section 140 with a physical contact interface. In other words, substantial loads are carried by the gear section 140. The gear section 140 has an axial width 148 that is substantially larger in magnitude than an axial width 152 of the gear section 144, which is thinner and is spaced away from the gear section 140.

Each planet gear 130 includes another gear section 144 that may also be referred to as a backlash reducing gear section 144. The gear section 144 is connected with the gear section 140 by a compliant section 146. The gear sections 140 and 144 each have gear teeth 150 and 154, respectively. The compliant section 146 does not have gear teeth and has a diameter 156 to its outer circumference that is smaller than the tip diameter 160 of the gear section 140 and the tip diameter 164 of the gear section 144.

Figure 5:
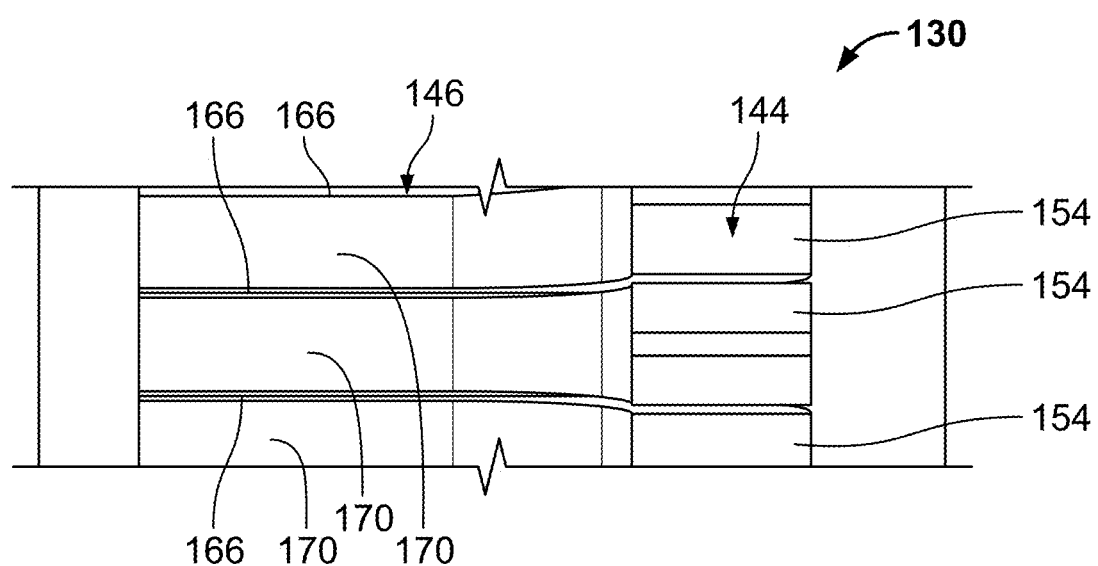
FIG. 5 is a detail view of the gear of FIGS. 3 and 4, in accordance with an exemplary embodiment.

The compliant section 146 allows the gear teeth 154 of the gear section 144 to move relative to the gear teeth 150 of the gear section 140. Referring additionally to FIG. 5, the compliant section 146 and the gear section 144 include a number of axially directed slits 166. The slits 166 may be cut through the gear section 144 and the compliant section 146 but not through the gear section 140. In this example there is one slit 166 between each adjacent pair of gear teeth 154. As shown in FIGS. 2 and 4, there is no bearing directly between the gear section 144 and the pin 138. As a result, the gear section 144 at the gear teeth 154 is separated from the pin 138 by a gap 168. The slits 166 define a number of beams 170 that are cantilevered off the gear section 140, with each beam 170 being a type of flexing arm and having one gear tooth 154 at its terminal end away from the gear section 140. The beams 170 are elastically compliant and allow their gear teeth 154 to deflect radially inward under load. The slits 166 and/or the material thickness of the beams 170 may be tuned to provide a desirable level of compliance and to define the level of the load at which the gear teeth 154 deflect and shift load carrying to the gear section 140.

Figure 6:
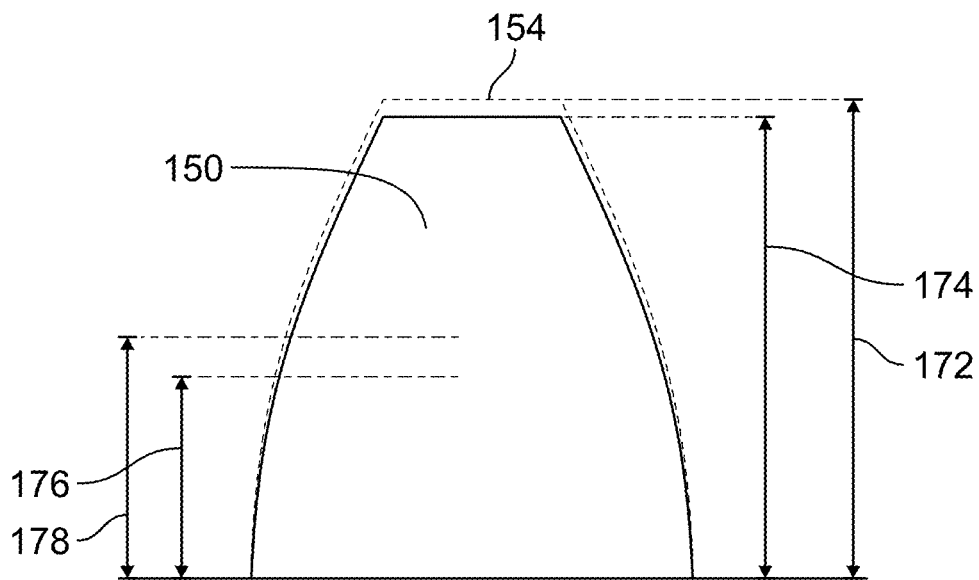
FIG. 6 is a schematic illustration of gear teeth orientation of the gear of FIGS. 3 and 4, in accordance with an exemplary embodiment.

To preload the gear section 144, and specifically its gear teeth 154, against the ring gear 136 and/or the sun gear 134, the gear section 144 is larger than the gear section 140. For example, as shown in FIG. 3, the gear section 144 may have the tip diameter 172 that is larger than the tip diameter 174 of the gear section 140. In various embodiments, as indicated in FIG. 6 the tip diameters 172 and 174 may be different in size, or the size differences may be based on the respective base diameters 176, or may be based on the respective reference diameters 178. In embodiments, the respective root diameters and/or tip diameters may be the same to ensure tip and root clearance for smooth operation. In other embodiments, the gear teeth 154 may have a larger tooth thickness as compared to the gear teeth 150. In other embodiments, the gear teeth 154 may be shifted relative to the gear teeth 150 such as by shifting the gear cutter by a profile shift coefficient. The profile shift coefficient may be positive where the tooth thickness is increased, or may be negative, where the tooth thickness is decreased. For purposes of the current disclosure, the gear teeth 154 being larger than the gear teeth 150 means that they are disposed differently to take up play between the planet gears 130 and the meshing ring gear 136 and/or the meshing sun gear 134 to be effective in controlling backlash.

During operation of the gearset 108, upon initial loading, the gear section 144 eliminates play between the planet gears 130 and the meshing ring gear 136 and/or the meshing sun gear 134. As the amount of loading increases, the gear teeth 154 deflect with the gear teeth 154 on their cantilevered beams 170 deflecting radially inward. With deflection, the gear section 140 carries the load and the gear section 144 has a much lower force on its gear teeth 154 as compared to the load on the gear teeth 150. When the gear section 140 carries the load, backlash is mitigated by the magnitude of the load and is no longer needed from the gear section 144. Wear on the gear section 144 is minimized due to the lower loads that it carries. In sum, the gear section 144 is oversized relative to the gear section 140 to eliminate backlash at low loads and deforms at higher loads to allow the gear section 140 to carry the loads. The switching point is tuned based on the application and the loads and speeds involved by adjusting parameters of the gear 130 such as the size of the slits 166 and/or of the beams 170.

Figure 7:
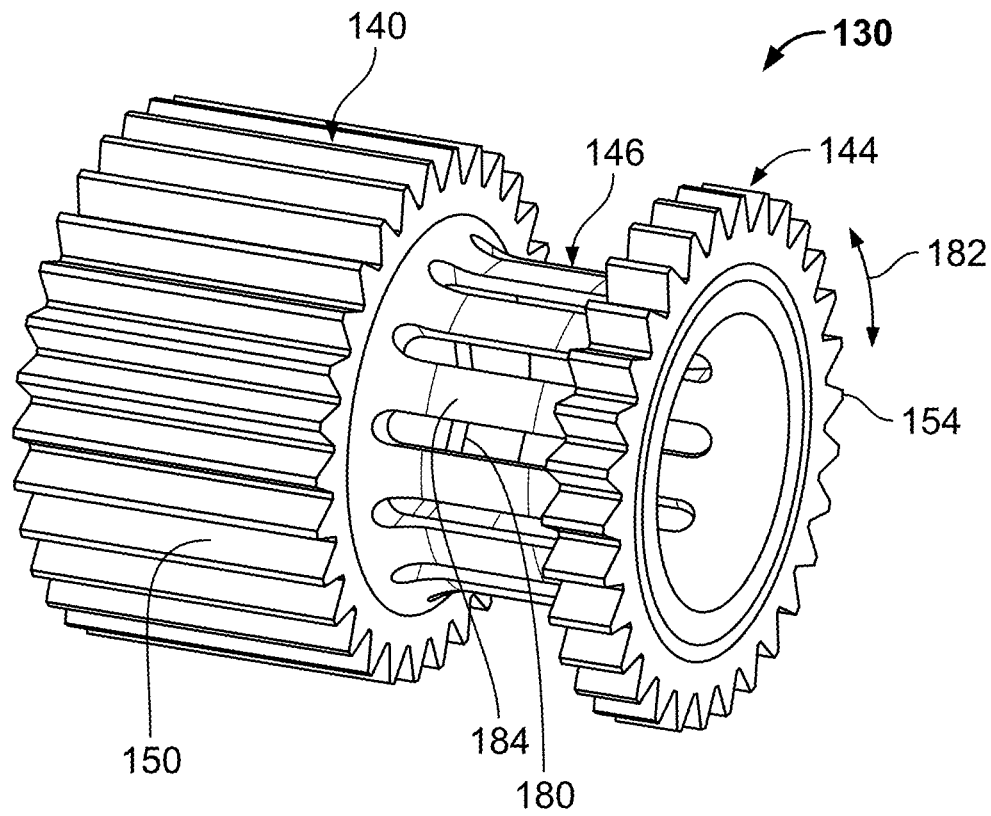
FIG. 7 is a perspective view of a gear of the gear systems of FIGS. 1 and 2, in accordance with an exemplary embodiment.

Referring to FIG. 7, the planet gears 130 of this example may again have a load carrying gear section 140, a backlash reducing gear section 144 and a compliant section 146. In this example, the gear section 140 and its gear teeth 150 are the same size (in terms of diameters and gear tooth thickness and profiles) as the gear section 144 and its gear teeth 154. The compliant section 146 again does not have gear teeth and has a smaller diameter at its outer circumference than the gear sections 140 and 144. The compliant section 146 has a number of axially directed openings 180 that may be cavities, thinned areas, cutouts, slits, slots or voids, and that are distributed around its circumference. The openings 180 define beams 184 between them and provide elastic deformability so that the gear section 144 may twist 182 relative to the gear section 140 under loading of the gearset 108 during preloading and/or operation.

Figure 8:
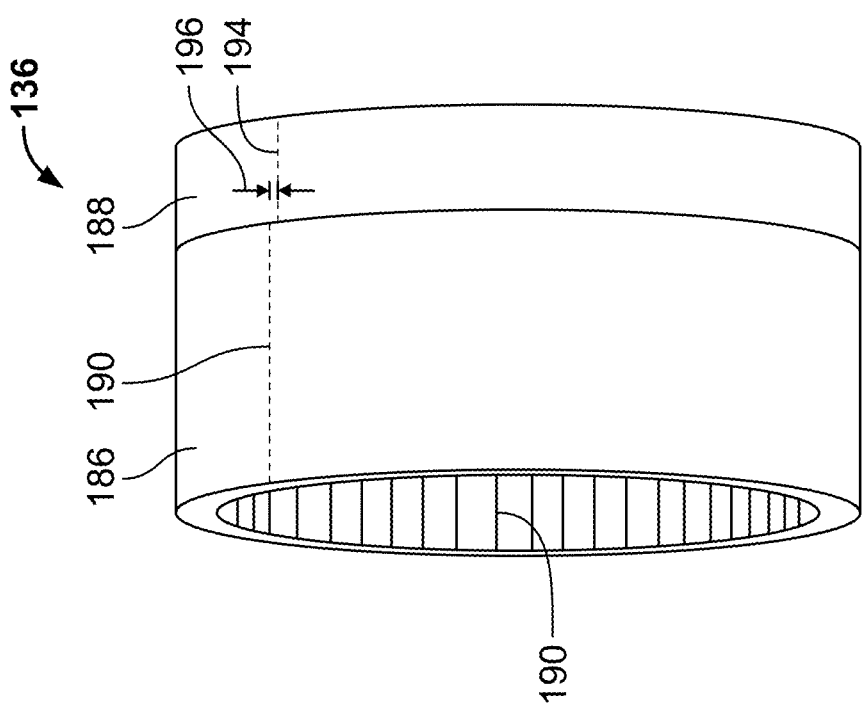
FIG. 8 is a schematic, perspective view of a gear of the gear systems of FIGS. 1 and 2, in accordance with an exemplary embodiment.

Referring additionally to FIG. 8, preloading of the gearset 108 may be accomplished in an example, by construction of the ring gear 136. In other embodiments, the sun gear 134 may be constructed in a similar fashion as described herein for the ring gear 136. In this example, the ring gear 136 has two sections 186 and 188. The ring gear 136 may be formed with its gear teeth 190 and may be separated into the two sections 186 and 188 such as by cutting, or the two sections 186 and 188 may be separately formed. In either case, the two sections 186 and 188 are joined together at a joint 192 and secured such as by pinning, fastening, welding or otherwise, to form one ring gear 136. The section 186 aligns with the gear section 140 of the planet gears 130 and its gear teeth 190 mesh with the gear teeth 150. The section 188 aligns with the gear section 144 of the planet gears 130 and its gear teeth 194 mesh with the gear teeth 154. Before securing the sections 186 and 188 together, the gear teeth 190 and 194 are offset 196 angularly relative to one another by orienting the section 188 to the section 186.

Figure 9:
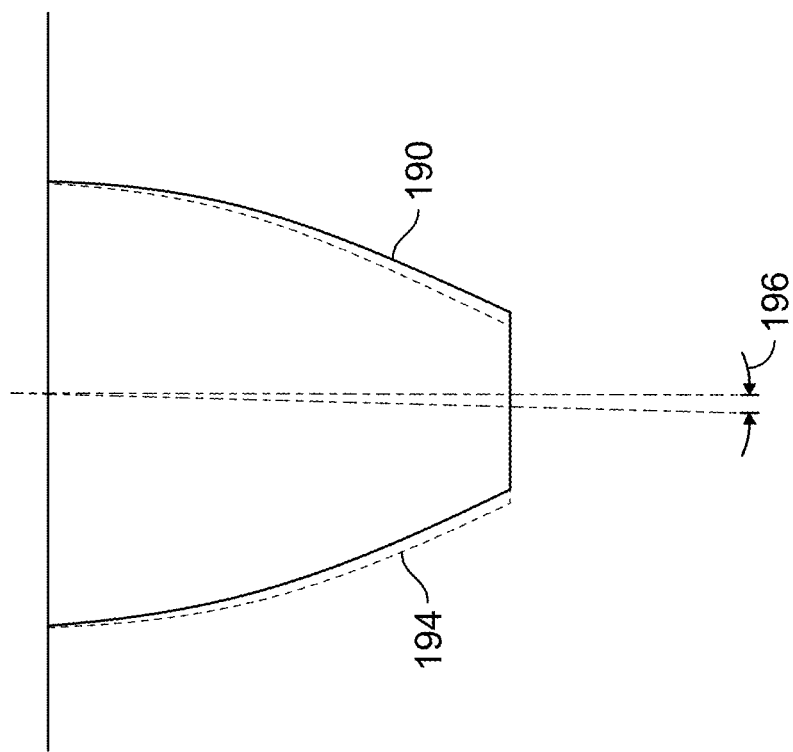
FIG. 9 is a schematic illustration of gear teeth orientation of the gear of FIG. 7 and/or of FIG. 8, in accordance with an exemplary embodiment.

As shown in FIGS. 8 and 9, the offset 196 is a small angular offset such as one degree. With the sections 186 and 188 secured together, the offset 196 requires the gear section 144 to twist relative to the gear section 140 during assembly so that the gear teeth 154 of the gear section 144 are preloaded against the gear teeth 194. This preloading takes up play between the meshing gears and eliminates backlash. As a result, the gear teeth 150 are also preloaded against the gear teeth 190. Upon initial operation of the gearset 108 at light loads, the gear section 144 provides a tight meshing quality without backlash. As loading increases, the gear section 140 takes up the load carrying function and the compliant section 146 keeps the loading on the gear section 144 low. The switching point at which the gear section 140 takes over the load carrying function may be tuned by the size of the openings 180 and the size of the beams 184.

The exemplary embodiments disclosed herein provide systems with controlled backlash for increased positional control, sensing accuracy and efficiency. Accordingly, gear systems with backlash control include a pair of meshing gears where at least one of the gears has a first gear section designed to carry heavy loads and a second gear section designed to control/reduce backlash at low load conditions. The gear sections are connected by a compliant section as one contiguous gear. The compliant section has a generally cylindrical shape with features around the compliant section that reduce stiffness so that the second gear section flexes relative to the first gear section. The second gear section may be biased relative to the first gear section so that teeth of the second gear section are preloaded in the low load condition. Backlash is controlled by the preloading at low load conditions and by the load itself at high load conditions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gear system with backlash control comprising:
a first gear having first gear teeth; and
a second gear meshing with the first gear wherein:
the second gear has a first gear section configured for carrying loads and a second gear section configured to control backlash, wherein the first gear section has a first axial thickness that is substantially larger than a second axial thickness of the second gear section;
the first gear section is connected with the second gear section by a compliant section having features around the compliant section that reduce stiffness so that the second gear section is moveable relative to the first gear section; and
the second gear section is biased relative to the first gear section so that teeth of the second gear section are preloaded against the first gear teeth of the first gear.

2. The gear system of claim 1, wherein the bias is provided by the second gear section being larger than the first section so that the second gear section mitigates play between the first gear and the second gear.

3. The gear system of claim 1, wherein the first gear is one of a ring gear or a sun gear and the second gear is a planet gear, wherein the bias is provided by the ring gear or the sun gear being assembled in two connected parts, wherein the two connected parts are rotated and fixed relative to one another at an angular orientation that is greater than zero.

4. The gear system of claim 1, wherein the bias is provided by the second gear section being twisted relative to the first section by assembly of the gear system so that second teeth of the second gear section are not aligned with first teeth of the first gear section.

5. The gear system of claim 1, wherein the second gear section has gear teeth, and wherein the compliant section of the second gear has slits that separate beams, wherein each of the beams carries one of the gear teeth.

6. The gear system of claim 1, wherein the compliant section has a number of openings so that the second gear section is twistable relative to the first gear section.

7. The gear system of claim 1, wherein the first gear section, the second gear section and the compliant section are formed together as one contiguous structure of the second gear.

8. The gear system of claim 1, wherein the second gear is mounted on a pin and wherein a bearing assembly is disposed in-line and between the first gear section and the pin and wherein no bearing is disposed inline and between the second gear section and the pin so that a gap is defined between the second gear section and the pin.

9. The gear system of claim 1, wherein the features of the compliant section comprise beams that are elastically compliant and are configured to allow the teeth of the second gear section to deflect radially inward under the loads.

10. The gear system of claim 1, wherein the second gear section has second gear teeth and is disposed different from the first gear section so that the second gear teeth are biased against the first gear teeth when the gear system is unloaded.

11. A gear system with backlash control comprising:
a first gear having first gear teeth; and
a second gear meshing with the first gear wherein:
the second gear has a first gear section with second gear teeth configured for carrying loads and a second gear section with third gear teeth configured to control backlash;
the first gear section is connected with the second gear section by a compliant section having a generally cylindrical shape with features around the compliant section that reduce stiffness so that the third gear teeth of the second gear section are moveable relative to the second gear teeth of the first gear section; and
the second gear section is biased relative to the first gear section so that the third gear teeth of the second gear section are preloaded against the first gear teeth of the first gear and the third gear teeth are disposed different than the second gear teeth relative to the first gear teeth when the gear system is unloaded.

12. The gear system of claim 11, wherein the bias is provided by the second gear section being larger than the first section so that the second gear section mitigates play between the first gear and the second gear.

13. The gear system of claim 11, wherein the first gear is one of a ring gear or a sun gear and the second gear is a planet gear, wherein the bias is provided by the ring gear or the sun gear being assembled in two connected parts, wherein the two connected parts are rotated and fixed relative to one another at an angular orientation that is greater than zero.

14. The gear system of claim 11, wherein the bias is provided by the third gear teeth of the second gear section being twisted relative to the second gear teeth of the first section by assembly of the gear system so that the third gear teeth of the second gear section are not aligned with the second gear teeth of the first gear section.

15. The gear system of claim 11, wherein the compliant section of the second gear has slits that separate beams, wherein each of the beams carries one of the third gear teeth.

16. The gear system of claim 11, wherein the compliant section has a number of openings so that the second gear section is twistable relative to the first gear section.

17. The gear system of claim 11, wherein the first gear section, the second gear section and the compliant section are formed together as one contiguous structure of the second gear.

18. The gear system of claim 11, wherein the second gear is mounted on a pin and wherein a bearing assembly is disposed in-line and between the first gear section and the pin and wherein no bearing is disposed inline and between the second gear section and the pin so that a gap is defined between the second gear section and the pin.

19. The gear system of claim 11, wherein the first gear section has a first axial thickness that is substantially larger than a second axial thickness of the second gear section.

20. A gear system with backlash control comprising:
a first gear having first gear teeth; and
a second gear meshing with the first gear wherein:
the second gear has a first gear section with second gear teeth configured for carrying loads and a second gear section with third gear teeth configured to control backlash, wherein the first gear section has a first axial thickness that is substantially larger than a second axial thickness of the second gear section;
the first gear section is connected with the second gear section by a compliant section having a generally cylindrical shape with openings around the compliant section that reduce stiffness so that the third gear teeth of the second gear section are moveable relative to the second gear teeth of the first gear section;
the second gear section is biased relative to the first gear section so that the third gear teeth of the second gear section are preloaded against the first gear teeth of the first gear and the third gear teeth are disposed different than the second gear teeth relative to the first gear teeth when the gear system is unloaded; and
wherein the first gear section is more rigid than the second gear section so that the first gear section carries the loads at increased loading of the gear system.

* * * * *